May 27, 1930.  N. RANSOHOFF  1,760,210
TRANSMISSION DEVICE
Filed May 26, 1928   2 Sheets-Sheet 1
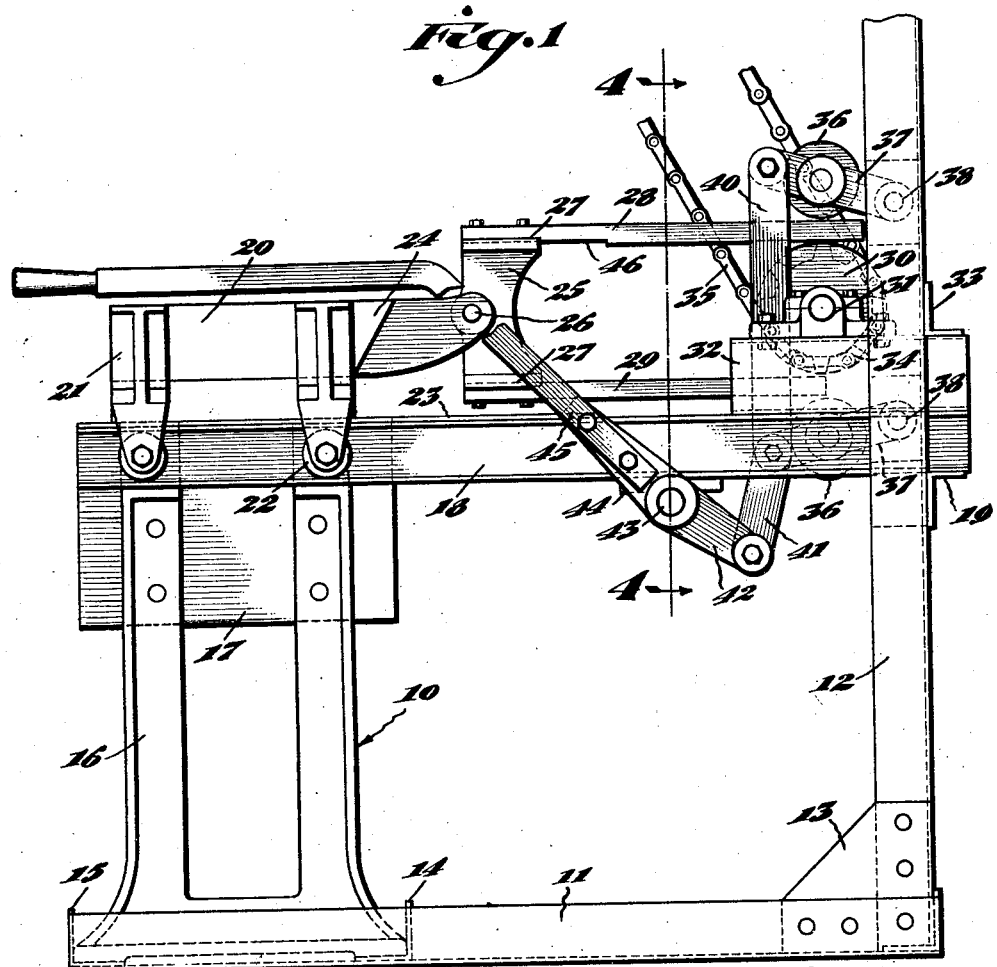
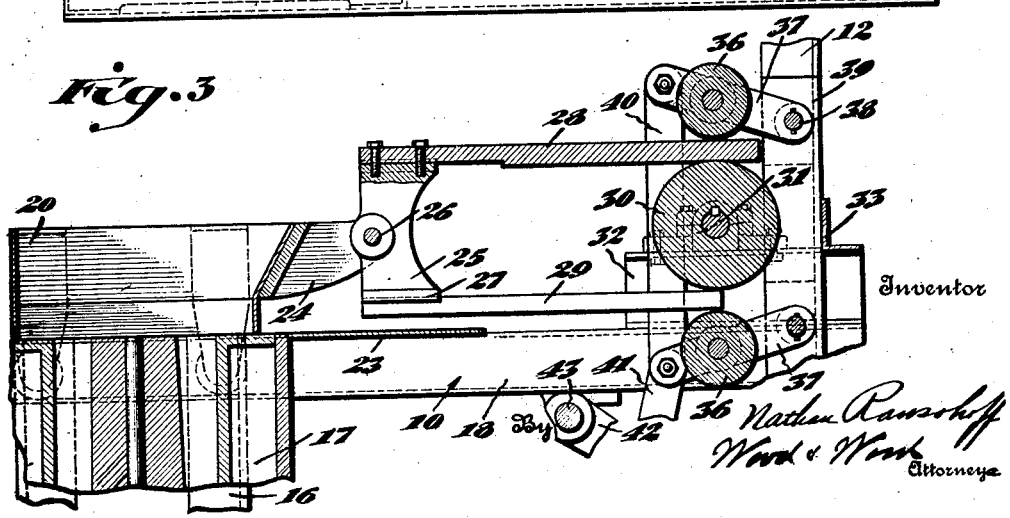

May 27, 1930.                N. RANSOHOFF                1,760,210
                           TRANSMISSION DEVICE
                    Filed May 26, 1928        2 Sheets-Sheet 2
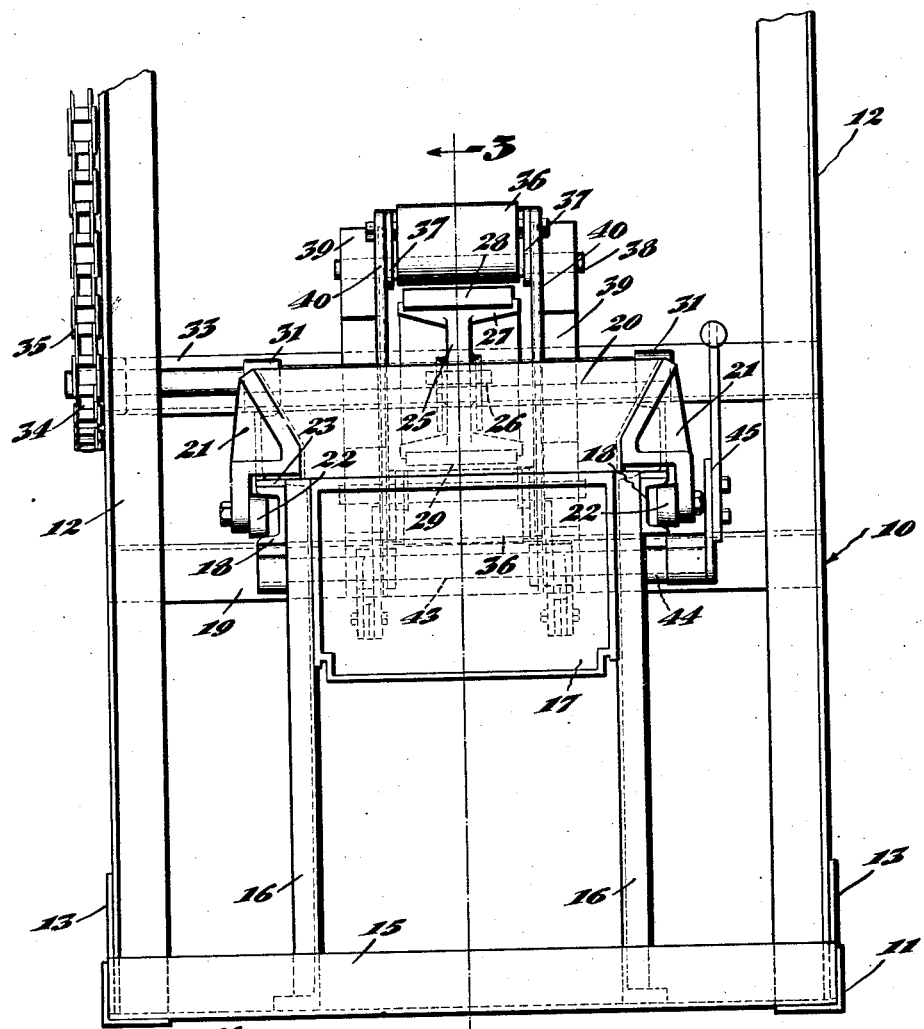
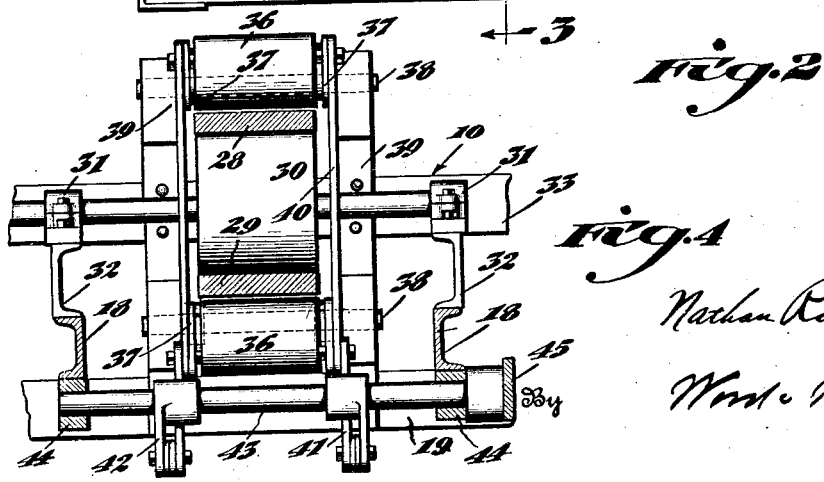
Inventor
Nathan Ransohoff
By
Attorneys Patented May 27, 1930

1,760,210

UNITED STATES PATENT OFFICE

NATHAN RANSOHOFF, OF CINCINNATI, OHIO

TRANSMISSION DEVICE

Application filed May 26, 1928. Serial No. 280,878.

This invention relates to power transmission mechanism and is particularly directed to a device for this purpose converting rotary motion into linear motion through the medium of friction. The device has useful application in translating any machine element, being shown in this instance incorporated in a concrete block casting machine in which the material is fed through a hopper into a mold and more specifically as attached to the hopper for translating or sliding the same toward and from its point of service over the mold for clearing and striking off the excess concrete from the mold during mold stripping operations.

This invention provides a device for translating a machine element in forward or reverse direction by the forced engagement of feeding arms or element extensions against diametrically opposite peripheral points of a drive roll, frictionally inducing movement of the arms tangentially of the roll. Therefore, an object of this invention is the conversion of one direction power roll rotation into linear motion of a machine element in either direction.

Still another object is to provide a mechanism which limits these forward and reverse linear movements of the machine element regardless of continued application of power and which permits feed of the element to any desired intermediate position under easy control.

Another object is the provision of a simple form of reversing mechanism in which the power in either direction is held in manually for the desired length of feed and translation quickly reversed.

Other objects and further advantages will be more fully set forth in a description of the accompanying drawings, forming a part of this specification, in which:

Figure 1 is a side elevation showing the device in full forward position and utilized for translating a hopper.

Figure 2 is an end view of the machine embodiment illustrated in Fig. 1.

Figure 3 is a sectional view taken on line 3—3, Fig. 2, showing the various elements in section and detailing the relation of the power roll, friction rollers and feeding elements.

Figure 4 is a sectional view taken on line 4—4, Fig. 1, further detailing the mechanism.

The mechanism provided toward the accomplishment of the above objects in general, comprises, a power driven roll, a pair of idler friction rollers disposed at diametrically opposite sides of the roll and a feeding arm of material having a friction surface such as wood, inserted between each friction roll and the power roll. These feeding arms extend commonly from the machine part to be fed and are fixed in spaced parallel relation and suitably maintained in proper alignment with the driving roll by the mounting of the element to be translated. The feeding arms are formed of different lengths, one thereof being short so as to become disengaged and rendered incapable of engagement with the power roll by translation of the arm to the limit of outward feed and the other of the pair of feeding arms being of suitable length so as to still be in position for a reversing engagement with the roll at this time. The thickness of the last mentioned feeding arm is reduced toward the element carrying end thereof, this reduction making it impossible for the arm to be engaged with the power roll at that particular point and to thereby limit feed in reversed direction.

Referring to the drawings, the machine incorporating the present improvement, is indicated, generally, at 10 and comprises the following arrangement of parts:

A base 11 is formed of angle iron lengths disposed in rectangular arrangement. Rear corner uprights 12 rise from the base 11 and are attached thereto by means of gusset plates 13. An angle iron 14 is further provided as part of the base and is disposed adjacent the front end thereof extending across between the side angles and spaced from the front end cross rail 15 of the base.

Side frames or supports 16 for a mold 17 have their feet secured to the end cross rail 15 and the cross piece 14, the mold being hung or supported between the upper ends of these side frames with its top surface disposed flush with the upper ends of the side frames. A pair of horizontal guide rails 18 formed of channel iron, have their forward ends secured to the respective outer faces of the frames 16 and their rear ends attached to and supported on an angle iron cross piece 19 secured across between the respective uprights 12, the channels of the rails being disposed outwardly for a guiding purpose hereinafter described.

A hopper 20 is mounted on these guide rails for horizontal reciprocation toward and from a position over the filling or top opening of the mold. A pair of brackets 21 is secured at each side of the sheet metal formed hopper, these brackets depending below the hopper and each having a roller 22 mounted on its inner side below the base of the hopper so that the hopper frame and brackets straddle the guide rails with a pair of rollers for each side disposed in the channels of the channel iron, these rollers resting on the lower flanges thereof thus providing a rolling carriage for the hopper. The hopper frame is of slightly greater width than the mold and consequently extends out over the top edges of the side frames. The lower edges of the hopper have a slight scraping engagement with the top of the mold and the top of the supports non-interfering with easy translation thereacross.

A plate 23 extends across between the guide rails being secured to the top faces thereof and has its forward edge abutting the rear end of the mold and being of sufficient width to extend beyond the points of rearmost retraction or translation of the hopper. The top surface of this plate is flush with the top surface of the mold due to the fact that the channel iron guide rails are lower than the top surface of the mold an amount equal to the thickness of the plate.

A smooth flush table or sliding surface is thus provided for the hopper and, as shown in Fig. 3, the hopper is free to be translated from a position over the mold opening to a position clear of the mold for the purpose of stripping the cast block from the mold by means of a mechanism not disclosed herein. The slight sliding or scraping engagement of the hopper with the top of the mold and the plate 23 is for the purpose of cleaning off excess material from the top of the mold and drawing it back onto the plate 23 from whence it may be scraped back into the mold for the formation of the next block. There is a tendency for the hopper to rise and the scraping action to be incomplete this being prevented by the engagement of the rollers with the underside of the top flanges of the guide rails there being a very slight clearance between the rollers and this flange during normal rolling movement of the hopper.

Translation is conveyed to the hopper by means of a power roll and an intermediate mechanism of the following description:

A forked coupler 24 extends from the rear end of the hopper and has a spacer block 25 pivotally attached thereto. This spacer block has a central boss traversed by the horizontally disposed pivot pin 26 extending through the arms of the coupler and provides wide upper and lower horizontally disposed flanges 27, these flanges being recessed a sufficient width to receive the ends of a pair of feeding arms 28, 29, upper and lower respectively. The trunnions of the power roll 30 are mounted in bearings 31, the bearings being mounted in turn on short channel iron members 32 attached to the rear ends of the guide rail 17, the channel irons 32 being braced by means of an angle iron cross piece 33 extending across and attached to the top surfaces thereof and secured to the uprights 12.

Power is imparted to the roll 30 by means of a sprocket 34 secured to the outer end of a trunnion and a sprocket chain 35 engaging around the sprocket. The arms or feeding extensions may be said to straddle the power roll or to be disposed adjacent the periphery thereof at diametrically opposite points. These feeding arms, although the upper engages the periphery of the roll due to the weight thereof, will not be translated or influenced by this engagement.

Actual frictional driving engagement is imparted to the feeding arms by means of a pair of idler or pressure inducing pulleys 36, these idler rollers being diametrically oppositely disposed relative to the power roll with the respective feeding arms passing between an idler pulley and the power roll in each instance. The idler pulleys are journaled for rotation in pivoted levers 37, the bearing points for the pulleys being at intermediate points of the levers, there being a pair of levers for each roll, one at each end thereof. The rear ends of these levers are pivotally attached as at 38 to a pair of stationary uprights 39 extending upwardly from and attached to the cross rails. The outer or forward ends of the swinging levers 37 are joined by means of a pair of links 40 there being a link joining the levers at corresponding ends of the idler rollers.

A second pair of levers 41 connect the pivoted lower ends of the respective first mentioned links 40 with the respective outer ends of a pair of levers 42 pinned to a cross shaft 43 rotatively mounted in brackets 44 secured to the respective under sides of the guide rails. A control lever 45 is pinned to the outer end of the cross rod 43 beyond the guide rail and extends forwardly to the front end of the machine alongside of the mold. The control lever is the common means for moving either idler roll since the links 40 cause the rollers 36—36 to be moved simultaneously.

As shown in Figure 1, the hopper is in position over the mold and in a position which will be termed a forward or mold filling position. It will be noted that at this time the upper feeding arm extends somewhat beyond actual contact with the periphery of the power roll which moves in clockwise direction and the arm is in position to be clamped between the idler pulley 35 and the power roll for frictional engagement against the power roll imparting reversed translation thereto and to the hopper for drawing it back from the mold. The lower arm, however, at this time, extends barely to a point of engagement with the roll so that if the operator attempts to move the lower pulley 36 upwardly to engage this feeding arm against the power roll, no feed can take place due to the termination of the feeder arm length. This short length forward feeding arm is the means for limiting forward motion of the device.

Operating from the position shown in Figure 1, the operator moves the control lever upwardly and through the lower pulley frictionally engages the reverse feeding upper arm with the power roll thus imparting translation thereto. The upper arm will then be moved due to friction along the periphery of the roll until the hopper is drawn back from the mouth of the mold. At this time a recessed portion or cut away portion 46 provided in the lower surface of the upper feeding arm will come into registry with the power roll and it will be impossible to contact the surface of the recess with the power roll and reverse feed will consequently end.

The forward ends of the respective feeding arms are supported and maintained in the proper plane relative to the power roll by their connection to the hopper. Their rear ends are supported by the upper arm resting on the top surface of the roll. The lever and links of the control arrangement are so proportioned in weight and arrangement as to cause the same and the control pulleys therewith to normally remain in any position in which they are set. Even if the weight or jostling of the parts should cause the upper roll to lie upon the top surface of the upper feeding arm there would be insufficient frictional contact caused to induce a feed.

Having described my invention, I claim:

1. A device of the class described, comprising, a drive roll, an element to be linearly moved, extensions provided on said element, said extensions arranged for engagement at opposite points of the periphery of the drive roll, means for alternately forcing said extensions into frictional engagement with the drive roll, and the friction surfaces of said extensions formed to become disengaged from the drive roll after a predetermined movement in either direction for automatically discontinuing the feed.

2. A device of the class described, comprising, a drive roll, an element to be translated, a pair of arms attached to said element to be translated, said arms having their inner surfaces respectively disposed adjacent to the roll at diametrically opposite points, a pair of idler rollers mounted in swinging bearings and adapted for movement radially of the drive roll, said rollers disposed for engagement with the respective outer surfaces of the arms, a control lever for actuating said pulleys to frictionally engage either arm against the roll, and said inner arm surfaces terminated for discontinuing the frictional engagement thereof with the roll at predetermined limits of translation in either direction.

3. A device of the class described, comprising, a drive roll, a member to be translated, a friction engagement inducing roller, an extension on said member to be translated, said extension disposed between said drive roll and said roller, and a control means for gripping the extension between said drive roll and said roller for frictionally imparting the movement of the drive roll thereto, said extension having its drive roll engaging surface terminated for discontinuing translation at a predetermined limit.

In witness whereof, I hereunto subscribe my name.

NATHAN RANSOHOFF.